Patented June 1, 1943

2,320,422

UNITED STATES PATENT OFFICE 2,320,422

PROCESS FOR THE PRODUCTION OF PHOTOGRAPHIC COLOR IMAGES

Alfred Fröhlich, Dessau, Germany; assignor to General Aniline & Film Corporation, New York, N. Y., a corporation of Delaware No Drawing. Application May 7, 1940, Serial No. 333,813. In Germany May 9, 1939

19 Claims. (Cl. 95—6)

This invention relates to the production of photographic color images.

It is known to use for the production of photographic color images silver halide emulsions containing dyestuff formers fast to diffusion, which are added in soluble form to the photographic silver halide emulsion, but are not capable of being washed out therefrom. Such dyestuff formers fast to diffusion are obtained from simple dyestuff components by introducing thereinto certain substituents preventing diffusion. As substituents preventing such diffusion there were proposed amongst others carbon chains containing more than five carbon atoms. Groups effecting water-solubility like sulfo- or carboxyl groups were also introduced in order to render the dyestuff formers water-soluble and to facilitate the incorporation thereof into the emulsion, also to prevent crystallisation of the substances before and after the manufacturing process.

Instead of said carbon chain radicals of resins, bile acids, polypeptides, carbohydrates have been introduced into the molecule of the dyestuff formers as substituents preventing diffusion.

In U. S. Patent 2,280,722 of April 21, 1942, it was proposed furthermore to introduce into the molecule of the dyestuff former substituents having several members, in which—besides the initial and end members—the same carbon arrangements appear several times being connected by hetero atoms. In this case for instance an ethylene oxide chain is connected to a molecule of the dyestuff former by polymerizing either ethylene oxide or its homologs directly onto a preliminary product of the dyestuff former or by connecting the dyestuff former to a suitable intermediate product which carries a chain substituent consisting for instance of polyethylene oxide.

In U. S. patent application Ser. No. 327,628, filed April 3, 1940, moreover, it was proposed to bind dyestuff formers directly onto nitrogenous polymerisates. Furthermore there was already mentioned to connect acid chlorides capable of forming dyestuffs with such polymers, which contain hydroxyl groups, for instance polyalcohols, polyvinyl alcohols and the like. Several disadvantages, however, are inherent in the dyestuff formers, which are thus obtained. If only part of the hydroxyl groups of the polymerisate is caused to react with the acid chloride of the dyestuff component, mostly alkali-soluble products are obtained, which, however, give very feeble colorings only. If, however, the acid chloride is employed in such a concentration, that most or all hydroxyl groups of the polymerisate come into reaction, products are obtained which are insoluble in aqueous alkalies. In order to be able to add these products to a silver halide emulsion, it is necessary to produce sufficient alkali-solubility by a sulfonating process. This subsequent sulfonating process, however, leads partly to a splitting up of the ester linkage and therefore partly to the splitting off of the dyestuff former from the polymerisate, which makes for a troublesome purification of the sulfonated product, if complete fastness to diffusion of the dyestuff former is required.

It is an object of this invention to produce photographic color images.

A further object is the production of photographic color images in silver halide emulsions by means of dyestuff formers fast to diffusion.

These and other objects will appear from the detailed specification following hereinafter.

It has been found that polymerisates containing hydroxyl groups may be employed in a simple manner for the production of easily soluble dyestuffs fast to diffusion and extensively stable towards alkalies, if the hydroxyl groups of the polymerisate are caused to react with aldehydes, with the formation of acetals. The aldehydes employed may be dyestuff formers per se, as for instance phenolic aldehydes, which form dyestuffs of different dyestuff classes according to the reaction conditions, or amino aldehydes, which form dyestuffs by a direct coupling reaction or by a transformation into azo-dyestuffs by a diazotizing process, or the aldehydes employed may be converted into dyestuff formers through substituents which are not able to react with the polymerisate containing hydroxy groups but are able to react with a suitable dyestuff former after the acetal formation between the aldehyde group and the polymerisate. An example of such aldehyde is amino benzaldehyde, which after reacting in the form of its hydrochloride with a polymerisate containing hydroxy groups to form the corresponding amino substituted acetal, is then caused to react wtih a naphthol carboxylic acid chloride.

The acetal formation between the polymerisate containing hydroxyl groups and the aldehyde compounds may be carried out both at ordinary and at elevated temperature.

Suitable polymerisates according to this invention are in principle all polymers containing hydroxyl groups, for instance polyvinyl alcohols, alkyd resins containing hydroxyl groups, for instance those from phthalic acid and glycerol, from sebacic acid and pentaerythrite or from adipic acid and glycerol.

According to this invention, moreover, polymerisates containing hydroxyl groups may be employed, in which a hydroxyl group is formed by a reaction carried out with the polymerisate. If for instance caustic soda is added to the mixed polymerisate from vinyl chloride and vinyl acetate and if the saponified product is precipitated after stirring for several hours with an organic solvent, a polymerisate containing hydroxyl groups, is obtained.

Suitable mixed polymerisates containing hydroxyl groups are obtained by simultaneously polymerizing monomers, free from hydroxyl groups, for instance polymerisates from vinyl acetate and maleic acid, fumaric acid, crotonic acid and itaconic acid. In these polymers the hydroxyl groups are freed from the acetates by subsequent saponification. Further suitable polymerisates are obtained, if vinyl acetate is polymerized with the esters of the above mentioned acids, for instance maleic acid ester, and if the polymerisates thus obtained are saponified.

The hydroxyl groups of the polymerisates may be, if necessary, partly acetalized with an aldehyde not suitable for direct dyestuff coupling, as for instance butyraldehyde, and the rest of the hydroxyl groups then acetalized with a suitable dyestuff coupling agent. If for this incomplete acetalizing process an aldehyde suitable for the later production of the dyestuff is used, the complete acetalisation of the polymerisate may be carried through in a second process with a second aldehyde, which although also suitable for forming a dyestuff, differs from the first one. In this way the shade of the final dyestuff can be markedly influenced.

For the acetalizing of the polymerisates containing hydroxyl groups aldehydes may be used, which are dyestuff formers themselves, as for instance m-hydroxybenzaldehyde, salicylaldehyde, o-vanillin, hydroxynaphthaldehyde, hydroxyphenyl-acetaldehyde, 1-hydroxy-2-naphthalene-acetaldehyde, o-hydroxycinnamic aldehyde, 2-4-6-trichloro-3-hydroxybenzaldehyde, 6-hydroxy-3-methylbenzaldehyde, 2-hydroxy-3,4-dimethylbenzaldehyde-5-carboxylic acid, 3-hydroxy-4-methoxybenzaldehyde and the like. Furthermore there may be introduced into the polymerisate containing hydroxyl groups aldehydes containing amino groups, such as for instance m-aminobenzaldehyde, ethyl aminobenzaldehyde and the like. The amino groups are used for binding the dyestuff formers onto the polymerisate. As dyestuff formers for that purpose all dyestuff formers are suitable which bear atoms or atom groups, which are suitable for the reaction with primary or secondary amino groups, i. e. carboxyl group, sulfo groups or halogens. Such dyestuff formers are for instance naphthol-sulfo acids, naphthol carboxylic acids, phenol carboxylic acids, cresotic acids with free p-position, xylenol carboxylic acids, in which the p-position to the hydroxyl group is either free or occupied by a halogen atom, further 1-hydroxybenzene-2,6-dicarboxylic acid, hydroxycinnamic acid, 1-hydroxy-2-methyl-4-bromo-benzene-6-carboxylic acid, hydroxycarbazole carboxylic acid, 2-hydroxy-diphenyl carboxylic acid, 2-hydroxydiphenyl-methane dicarboxylic acid, 5-hydroxytetrahydroquinoline-6-carboxylic acid, compounds which carry an active methylene group and an acid group, as for instance phenylpyrazolone carboxylic acid, methylnaphthyl pyrazolone carboxylic acids, hydroxythionaphthene carboxylic acids, acetoacetyl anthranilic acids, benzoylacetyl amino benzoic acid esters and the like.

The introduction of these compounds into the polymerisate is accomplished especially by means of the activated acid groups, for instance by means of the acid chlorides or esters or with the aid of reactive halogen atoms or aldehyde groups. The reaction is carried out according to known methods, for instance by melting together the polymerisates with acid halides in the presence of an acid-binding agent, for instance of a tertiary amine like pyridine or quinoline, of an alkali-alcoholate or enolate, if necessary in a nitrogen atmosphere, and, if the polymerisate has too high a melting point, in the presence of a solvent, for instance nitrobenzene, acetophenone, butyl- acetate, phenyl acetate, or of the corresponding alcohols or of high-boiling ethers like dibutylether.

The reaction of the polymerisate containing hydroxyl groups with the aldehydes mentioned above is accomplished by heating both compounds either in solution, in suspension or in the melt, advantageously in the presence of a weak mineral acid or of an organic acid. If the condensation is carried out in the presence of a weak acid, the corresponding acetate instead of the polymerisate with free hydroxyl groups may be employed. In this case the acetate is saponified and afterwards the freed hydroxyl groups are acetalized in the same reaction process.

All acetals used according to the present invention, which bear color-forming groups, are dissolved in a more or less viscous form, provided they are not water-soluble themselves, and may be added in this solution directly at any time to a silver halide emulsion. They may be mixed also with a gelatin solution and this solution can be added, if necessary, after a short washing process to the silver halide emulsion, or the gelatin solution may be used for the manufacture of a silver halide emulsion. The silver halide emulsion containing these dyestuff formers fast to diffusion may be subjected to a short washing process before casting and worked up into photographic emulsion layers in a manner known per se. The photographic emulsion layers are arranged, if necessary, on top of one another on one or both sides of the support and are sensitized for different spectral regions.

But the silver halide emulsions may be worked up also in a different way. For instance differently sensitized emulsions may be arranged on the same support together with different dyestuff formers in the form of small particles.

The production of the color images may be accomplished in different ways, for instance according to U. S. Patents 2,179,228, 2,179,238, 2,186,849, 2,178,612 and 2,186,730. The images may be formed in the exposed emulsion layers by simple color-forming development or reversal development according to U. S. Patents 2,179,234 and 2,229,137. The dyestuff formers according to this invention, moreover, may be employed together with other dyestuff formers fast to diffusion within the different emulsion layers, according to U. S. Patents 2,178,612, 2,179,238, 2,179,244, 2,186,732, 2,186,849 and 2,186,850.

*Example I*

40 grams polyvinyl alcohol are mixed with 40 cc. of salicylaldehyde. There are added 200 cc. glacial acetic acid and the mixture heated for one hour at 100° C. while stirring. The liquid changes gradually into a transparent jelly, and this is then rubbed out with water. By dissolving this substance in diluted alkali, precipitating with acetone and by repeating this operation several times, a white fibrous product is obtained, which dissolves in water to form a colorless solution. 8 grams of this powder are added to 1 kg. silver halide emulsion.

The layers cast from this emulsion yield a blue dyestuff image after exposure and development with a solution, alkaline with soda, of p-dimethyl-aniline. If, however, the development is carried out in an ordinary black- and white-developer and, if the silver image obtained is transformed into a silver antidiazotate image in a known manner, yellow to red dyestuff images are obtained depending upon the diazo compounds employed.

*Example II*

100 cc. water are poured over 40 grams of the saponified mixed polymerisate consisting of vinyl chloride and vinyl acetate. 20 cc. m-hydroxybenzaldehyde and 10 cc. of 1% hydrochloric acid are then added. The mixture is then heated on a steam bath for 24 hours while stirring, then precipitated with acetone. The precipitate is purified by dissolving it in water and by reprecipitating it in acetone, such operation being repeated 5–6 times. When adding this substance to silver halide emulsions in an alkaline solution as in Example I, dyestuff formers are obtained which are similar to those of Example I.

*Example III*

40 grams polyglycerol are saponified in 100 cc. of glacial acetic acid. 20 grams of o-hydroxyphenylacetaldehyde are added and the mixture is heated on a steam bath for 6 hours. The condensation product is washed 3–4 times with ether. 25 grams of the residue are then added as a 5 per cent aqueous solution to 300 cc. of a 15 per cent gelatin solution. After the gelatin is solidified and reduced to small particles, it is washed for 10 hours and then added to 1 kg. silver halide emulsion. It is further worked up according to Example I.

*Example IV*

40 grams polyvinyl alcohol are suspended in 200 cc. glacial acetic acid and thereto are added 20 grams 1-hydroxy-2-naphthaldehyde. The mixture is then heated on a steam bath for three hours while stirring, precipitated with acetone, dissolved in diluted caustic soda solution and the condensation product precipitated with acetone. The condensation product is purified from excess aldehyde by repeating this operation several times. 5 grams of this product are added to ½ kg. of silver halide emulsion. The emulsion is further worked up according to Example I.

*Example V*

40 grams of the saponified mixed polymerizate obtained from the ethyl ester of maleic acid and vinyl acetate are mixed with 40 cc. of salicyl aldehyde and to this mixture there are then added 400 cc. of glacial acetic acid and 5 cc. of concentrated sulfuric acid. The resulting mixture is then heated at 100° C. for 3 hours while stirring the mixture. The jelly obtained by this operation is washed with ether. By repeating this operation several times with fresh ether, the condensate is freed from excessive aldehyde and a white powder is obtained soluble to a jelly in diluted caustic soda solution.

5 grams of this product are added as a 2½ per cent solution to 500 cc. silver halide emulsion. It is further worked up according to Example I.

*Example VI*

40 grams of polyvinyl alcohol are suspended in 200 cc. of glacial acetic acid. Thereto are added 40 grams of 2-hydroxy-3,4-dimethylbenzaldehyde-5-carboxylic acid and the mixture heated on a steam bath for 5 hours while stirring. The jelly thus obtained is washed several times with acetone. 5 grams of this product are added in the form of a 2½ per cent solution alkaline with soda to 500 cc. silver halide emulsion. This emulsion is further worked up according to Example I.

*Example VII*

40 grams of polyvinyl alcohol acetalized with m-methylaminobenzaldehyde are suspended in 200 cc. of dimethylaniline and thereto are added 40 grams 1,2,3,4-xylenol carboxylic acid chloride. After everything has been added the mixture is heated 20 minutes at 150° C. The reaction product is precipitated with 2 liters of ether, the precipitate sucked off and washed with ether. A nearly white powder soluble in dilute caustic soda solution is obtained.

30 grams of this product are added in the form of a 5 per cent solution to 1 kg. of a silver halide emulsion. A photographic layer cast from this emulsion yields a blue dyestuff image after exposure, when developed with p-amino-dimethyl-aniline. If, however, the silver image is changed in a known manner into an antidiazotate silver image, a red to blue-violet dyestuff image is obtained depending upon the diazo component employed.

*Example VIII*

15 grams of the condensate obtained according to Example VII from polyvinyl alcohol acetalized with m-amino-benzaldehyde are condensed with phenylmethyl-pyrazolone carboxylic acid. If the layer is worked up according to Example VII, red or yellow dyestuff images are obtained.

*Example IX*

15 grams of the product obtained according to Example VII from polyvinyl alcohol acetalized with aminobenzaldehyde are condensed with acetoacetyl-amino-phenyl carboxylic acid. If the layer is worked up according to Example VII, yellow dyestuff images are obtained.

*Example X*

20 grams of the mixed polymerisate from vinylacetate and crotonic acid are stirred on a steam bath for 3 hours with 200 cc. of water and 100 cc. of 20 per cent caustic soda solution. 70 cc. concentrated hydrochloric acid, 150 cc. glacial acetic acid and 50 cc. salicylaldehyde are added after stirring for 3 hours. The reaction product is stirred four more hours on a steam bath and then precipitated with ether. The precipitate is washed several times with ether and 20 grams thereof are added in a 2 per cent alkaline solution to 1 kg. of silver halide emulsion. The emulsion is worked up according to Example I.

What I claim is:

1. A silver halide emulsion containing as a color former fast to diffusion, an acetal of a polymer containing hydroxyl groups and an aldehyde said color former being capable of coupling with the oxidation products of a primary aromatic amino developer to form a color image.

2. Compositions as defined in claim 1, wherein the aldehyde is a hydroxy aromatic aldehyde.

3. Compositions as defined in claim 1, wherein the aldehyde is an amino aldehyde.

4. Compositions as defined in claim 1, wherein the aldehyde contains a primary amino group.

5. Compositions as defined in claim 1, wherein the aldehyde contains a secondary amino group.

6. Silver halide emulsions containing as a color former fast to diffusion an acetal of a polymer containing hydroxyl groups with an aromatic amino aldehyde, said aldehyde having linked thereto by virtue of said amino group a color forming component capable of coupling with the oxidation products of a primary aromatic amino developer to produce a color image.

7. A silver halide emulsion for color photography having incorporated therein an acetal obtained by condensing a polymerizate having a hydroxy group with an aldehyde, said acetal as well as said aldehyde being capable of forming a dyestuff with the oxidation products of an aromatic silver halide emulsion developer containing a primary amino group.

8. A silver halide emulsion for color photography having incorporated therein as the dyestuff former an acetal obtained by condensing a polymerizate having a hydroxy group with an aldehyde carrying at least one substituent incapable of reacting with said polymerizate and capable of reacting with a dyestuff former having the ability to form a dyestuff with the oxidation products of an aromatic developer containing a primary amino group and condensing the product thus formed with a dyestuff former of this kind.

9. A silver halide emulsion for color photography having incorporated therein an acetal obtained by condensing a polymerizate having a hydroxy group with an aldehyde carrying a secondary amino group, and condensing the product thus formed with a dyestuff former capable of reacting with said amino group and of forming a dyestuff with the oxidation products of a primary aromatic amino developer.

10. Silver halide emulsions containing as a color former fast to diffusion an acetal of a polymer containing hydroxyl groups with an aromatic amino aldehyde, said aldehyde having linked thereto by virtue of said amino group a phenol carboxylic acid.

11. A silver halide emulsion containing as a color former fast to diffusion an amide of a color former and the acetal obtained by the condensation of polyvinyl alcohol with an aromatic amino aldehyde.

12. A silver halide emulsion containing as a color former fast to diffusion an amide of a color former and the acetal obtained by the condensation of a saponified mixed polymer of vinyl chloride and vinyl acetate with an aromatic amino aldehyde.

13. A silver halide emulsion containing as a color former fast to diffusion an amide of a color former and the acetal obtained by the condensation of a saponified mixed polymer of the ethyl ester of maleic acid and vinyl acetate with an aromatic amino aldehyde.

14. The composition as defined in claim 11 wherein the color former is a phenol carboxylic acid.

15. The composition as defined in claim 12 wherein the color former is a phenol carboxylic acid.

16. The composition as defined in claim 13 wherein the color former is a phenol carboxylic acid.

17. The composition as defined in claim 11 wherein the aldehyde is an amino benzaldehyde.

18. A silver halide emulsion containing as a color former fast to diffusion the amide of a color former and the acetal obtained by the condensation of polyvinyl alcohol with m-methyl-amino benzaldehyde.

19. A silver halide emulsion containing as a color former fast to diffusion the amide of 1.2.3.4-xylenol carboxylic acid and the acetal obtained by the condensation of polyvinyl alcohol with m-methyl-amino benzaldehyde.

ALFRED FRÖHLICH.

DISCLAIMER 2,320,422.—*Alfred Fröhlich*, Dessau, Germany. PROCESS FOR THE PRODUCTION OF PHOTOGRAPHIC COLOR IMAGES. Patent dated June 1, 1943. Disclaimer filed January 31, 1945, by the assignee, *General Aniline & Film Corporation*.

Hereby enters this disclaimer to claims 1 to 8 inclusive, and claims 11, 14, and 17 of said patent.

[*Official Gazette March 6, 1945.*]